United States Patent

Sendonaris et al.

[11] Patent Number: 6,141,552
[45] Date of Patent: Oct. 31, 2000

[54] ESTIMATION OF MOBILITY FOR NETWORK PLANNING BASED ON HIGHWAY MAPS AND TRAFFIC DATA

[75] Inventors: Andrew Sendonaris, Houston; Hongyi Chen, Dallas; Nikhil Jain, Plano; Seshagri Madhavapeddy, Richardson; Sairam Subramanian, Dallas, all of Tex.

[73] Assignee: Nortel Networks Corporation, Montreal, Canada

[21] Appl. No.: 08/971,441

[22] Filed: Nov. 17, 1997

[51] Int. Cl.⁷ ........................................................ H04Q 7/00
[52] U.S. Cl. ............................................ 455/436; 455/33.2
[58] Field of Search ....................................... 455/453, 440, 455/443, 524, 525, 33.1, 33.2, 33.4, 54.1, 54.2, 56.1, 67.1, 939, 441, 436, 437, 446, 450

[56] References Cited

U.S. PATENT DOCUMENTS

| | | | |
|---|---|---|---|
| 4,670,899 | 6/1987 | Brody et al. | 379/60 |
| 5,214,789 | 5/1993 | George | 455/33.2 |
| 5,241,685 | 8/1993 | Bodin et al. | 455/33 |
| 5,633,915 | 5/1997 | Yang et al. | 379/60 |
| 5,749,055 | 5/1998 | Dahlin | 455/553 |
| 5,896,573 | 4/1999 | Yang et al. | 455/453 |
| 5,950,134 | 9/1999 | Agrawal et al. | 455/439 |

Primary Examiner—Daniel S. Hunter
Assistant Examiner—Pablo Tran
Attorney, Agent, or Firm—John D. Crane; Felsman, Bradley, Vaden, Gunter & Dillon, LLP

[57] ABSTRACT

The mobility of mobile subscribers within a wireless digital communications system is estimated based on highway maps and traffic data. Cells within the network are modelled as nodes connected by edges where neighboring cells are connected by roads. Each edge has two edge weight components representing traffic flow from one cell to the other and vice versa. The edge weight components are calculated from terrain factors based on the size or capacity of the roads connecting the two cells and the total traffic within the subject cell, which information may be obtained from commercial geographic databases and/or government agencies. The resulting edge weight represents an expected number of handoffs between the two cells. The problem of partitioning cells among available switches within the network is thus reduced to the purely mathematical problem of minimizing the total edge weights of edges intersected by the partition boundaries. Existing mathematical optimization techniques for optimizing node-edge systems may therefore be applied to reduce the total number of expected inter-switch handoffs as mobile subscribers pass from cell to cell within the network.

18 Claims, 12 Drawing Sheets

| | | | | |
|---|---|---|---|---|
| Switch 1: | DAL3413A | DALP0127 | FTW3263 | FTWP0146A |
| ******** | DAL3414B | DALP0128 | FTW3264A | FTWP0440B |
| | DAL3415A | DALP0130D | FTW3267B | FTWP0554 |
| | DAL3418 | DALP0132A | FTW3269B | FTWP0568 |
| | DAL3420A | DALP0253A | FTW3283 | FTWP0583B |
| DAL1002 | DAL3425 | DALP0335 | FTW3284C | FTWP0584A |
| DAL2010 | DAL3428A | DALP0439A | FTW3285B | FTWP0599 |
| DAL2013 | DAL3431A | DALP0581 | FTW3291A | FTWP0835A |
| DAL3171A | DAL3432 | DALP0585 | FTW3292A | FTWP0884A |
| DAL3173 | DAL3433A | DALP0587A | FTW3309B | FTWP0891 |
| DAL3311 | DAL3434E | DALP0595B | FTW3310 | FTWP0895A |
| DAL3312 | DAL3437 | DALP0604A | FTW3313A | FTWP0900A |
| DAL3314A | DAL3438B | DALP0612 | FTW3321A | FTWP1032A |
| DAL3315K | DAL3439B | DALP0621A | FTW3322A | FTWP1034B |
| DAL3316A | DAL3440E | DALP0626 | FTW3344 | FTWP1051A |
| DAL3317 | DAL3442E | DALP0669K | FTW3345A | |
| DAL3324 | DAL3448E | DALP0693 | FTW3348A | |
| DAL3325 | DAL3450EA | DALP0700 | FTW3357A | |
| DAL3327 | DAL3451A | DALP0711A | FTW3358A | |
| DAL3328A | DAL3472A | DALP0715C | FTW3365A | |
| DAL3329A | DAL3474 | DALP0725A | FTW3370A | |
| DAL3330 | DAL5002 | DALP0734B | FTW3371C | |
| DAL3332A | DAL5003 | DALP0740A | FTW3372 | |
| DAL3333 | DAL5006A | DALP0761 | FTW3375 | |
| DAL3335A | DAL5008 | DALP0805 | FTW3382B | |
| DAL3336 | DAL5009A | DALP0813A | FTW3393B | |
| DAL3339 | DAL5010 | DALP0817 | FTW3424A | |
| DAL3341 | DAL5012A | DALP0828A | FTW3429 | |
| DAL3347B | DAL5013 | DALP0854 | FTW3430A | |
| DAL3361A | DAL5014K | DALP0878 | FTW3435 | |
| DAL3362 | DAL5029A | DALP0886 | FTW4000A | |
| DAL3366A | DAL5031A | DALP0897A | FTW5020 | |
| DAL3367 | DAL5040 | FTW3444 | FTW5023 | |
| DAL3368 | DAL5048 | FTW5005A | FTW5025 | |
| DAL3373A | DAL5052A | FTW5024A | FTW5027 | |
| DAL3374C | DAL5053 | FTW5045 | FTW5034A | |
| DAL3376 | DAL5056A | | FTW5036 | |
| DAL3378 | DAL5056B | | FTW5037A | |
| DAL3379 | DAL5058E | Switch 2: | FTW5038 | |
| DAL3381A | DAL5083E | ******** | FTW5039A | |
| DAL3383A | DAL5100 | | FTW5046 | |
| DAL3384 | DAL5111 | DAL3288 | FTW5049A | |
| DAL3386 | DAL5112 | DAL3296 | FTW5050 | |
| DAL3390 | DAL5114 | DAL3338 | FTW5058 | |
| DAL3392A | DALHYATTW | DAL3359 | FTWP0038A | |
| DAL3394 | DALP0040 | DAL3436 | FTWP0048A | |
| DAL3396 | DALP0042 | DAL5054A | FTWP0049A | |
| DAL3397A | DALP0044 | DALP0556 | FTWP0060 | |
| DAL3398A | DALP0101A | FTW11033A | FTWP0061A | |
| DAL3399 | DALP0102A | FTW2054B | FTWP0067A | |
| DAL3400 | DALP0112A | FTW2058A | FTWP0073A | |
| DAL3408 | DALP0123 | FTW3255A | FTWP0141A | |
| DAL3411A | DALP0124A | FTW3258A | FTWP0142 | |
| DAL3412A | DALP0125 | FTW3262A | FTWP0143A | |

*Fig. 8B*

|  |  |  |  |  |
|---|---|---|---|---|
|  | FTW5034A | DALHYATTW | FTWP1051A | DAL5112 |
|  | FTW5036 | DALP0042 |  | DAL5114 |
| Switch 1:<br>******** | FTW5037A | DALP0128 |  | DALP0101A |
|  | FTW5038 | DALP0253A | Switch 3: | DALP0102A |
|  | FTW5039A | DALP0335 | ******** | DALP0112A |
| DAL3288 | FTW5045 | DALP0556 |  | DALP0123 |
| DAL3312 | FTW5046 | DALP0604A | DAL3314A | DALP0127 |
| DAL3317 | FTW5049A | DALP0612 | DAL3315K | DALP0130D |
| DAL3336 | FTW5050 | DALP0626 | DAL3316A | DALP0132A |
| DAL3347B | FTW5058 | DALP0669K | DAL3325 | DALP0581 |
| DAL3362 | FTWP0038A | DALP0693 | DAL3327 | DALP0585 |
| DAL3367 | FTWP0049A | DALP0700 | DAL3328A | DALP0587A |
| DAL3368 | FTWP0061A | DALP0711A | DAL3329A | DALP0595B |
| DAL3379 | FTWP0141A | DALP0715C | DAL3332A | DALP0621A |
| DAL3396 | FTWP0142 | DALP0805 | DAL3333 | DALP0725A |
| DAL3399 | FTWP0143A | DALP0828A | DAL3335A | DALP0734B |
| DAL3400 | FTWP0146A | DALP0854 | DAL3341 | DALP0740A |
| DAL3440E | FTWP0554 | DALP0878 | DAL3361A | DALP0761 |
| DAL3442E | FTWP0583B | DALP0886 | DAL3373A | DALP0813A |
| DAL3450EA | FTWP0884A | DALP0897A | DAL3374C | DALP0817 |
| DAL5009A | FTWP1034B | FTW3263 | DAL3378 |  |
| DAL5012A |  | FTW3264A | DAL3390 |  |
| DAL5013 |  | FTW3267B | DAL3392A |  |
| DAL5014K | Switch 2: | FTW3283 | DAL3394 |  |
| DAL5031A | ******** | FTW3284C | DAL3397A |  |
| DAL5052A |  | FTW3285B | DAL3398A |  |
| DALP0040 | DAL1002 | FTW3310 | DAL3411A |  |
| DALP0044 | DAL2010 | FTW3321A | DAL3413A |  |
| DALP0124A | DAL2013 | FTW3322A | DAL3414B |  |
| DALP0125 | DAL3171A | FTW3344 | DAL3415A |  |
| DALP0439A | DAL3173 | FTW3345A | DAL3418 |  |
| FTW11033A | DAL3296 | FTW3348A | DAL3420A |  |
| FTW2054B | DAL3311 | FTW3357A | DAL3425 |  |
| FTW2058A | DAL3324 | FTW3365A | DAL3428A |  |
| FTW3255A | DAL3330 | FTW3382B | DAL3431A |  |
| FTW3258A | DAL3338 | FTW3424A | DAL3432 |  |
| FTW3262A | DAL3339 | FTW3444 | DAL3433A |  |
| FTW3269B | DAL3359 | FTW4000A | DAL3434E |  |
| FTW3291A | DAL3366A | FTW5005A | DAL3437 |  |
| FTW3292A | DAL3376 | FTW5020 | DAL3438B |  |
| FTW3309B | DAL3381A | FTW5024A | DAL3451A |  |
| FTW3313A | DAL3383A | FTWP0048A | DAL3472A |  |
| FTW3358A | DAL3384 | FTWP0060 | DAL5002 |  |
| FTW3370A | DAL3386 | FTWP0067A | DAL5008 |  |
| FTW3371C | DAL3408 | FTWP0073A | DAL5010 |  |
| FTW3372 | DAL3412A | FTWP0440B | DAL5029A |  |
| FTW3375 | DAL3436 | FTWP0568 | DAL5048 |  |
| FTW3393B | DAL3439B | FTWP0584A | DAL5053 |  |
| FTW3429 | DAL3448E | FTWP0599 | DAL5054A |  |
| FTW3430A | DAL3474 | FTWP0835A | DAL5056A |  |
| FTW3435 | DAL5003 | FTWP0891 | DAL5056B |  |
| FTW5023 | DAL5006A | FTWP0895A | DAL5083E |  |
| FTW5025 | DAL5040 | FTWP0900A | DAL5100 |  |
| FTW5027 | DAL5058E | FTWP1032A | DAL5111 |  |

*Fig. 9B*

| Switch 1: | | | | |
|---|---|---|---|---|
| | FTWP0143A | DALP0817 | DALP0828A | DAL5008 |
| | FTWP0146A | DALP0897A | DALP0854 | DAL5009A |
| | FTWP0554 | FTW3444 | DALP0878 | DAL5010 |
| | FTWP0568 | FTW5005A | DALP0886 | DAL5012A |
| DAL3288 | FTWP0583B | FTW5023 | FTW3264A | DAL5013 |
| DAL3296 | FTWP0835A | FTW5024A | FTW3267B | DAL5014K |
| DAL3338 | FTWP0884A | FTW5034A | FTW3310 | DAL5029A |
| DALP0556 | FTWP0891 | FTW5037A | FTW3344 | DAL5031A |
| FTW11033A | FTWP0895A | | FTW3345A | DAL5052A |
| FTW2054B | FTWP1032A | | FTW3348A | DAL5056A |
| FTW2058A | FTWP1034B | Switch 3: | FTW3382B | DAL5056B |
| FTW3255A | | | FTW3424A | DAL5100 |
| FTW3258A | | | FTW4000A | DAL5111 |
| FTW3262A | Switch 2: | DAL1002 | FTW5020 | DAL5112 |
| FTW3263 | | DAL2010 | FTWP0048A | DAL5114 |
| FTW3269B | | DAL2013 | FTWP0440B | DALP0040 |
| FTW3283 | DAL3171A | DAL3311 | FTWP0584A | DALP0044 |
| FTW3284C | DAL3173 | DAL3330 | FTWP0599 | DALP0102A |
| FTW3285B | DAL3325 | DAL3339 | FTWP0900A | DALP0112A |
| FTW3291A | DAL3327 | DAL3359 | FTWP1051A | DALP0124A |
| FTW3292A | DAL3328A | DAL3366A | | DALP0125 |
| FTW3309B | DAL3329A | DAL3374C | | DALP0127 |
| FTW3313A | DAL3341 | DAL3376 | Switch 4: | DALP0439A |
| FTW3321A | DAL3381A | DAL3383A | | DALP0740A |
| FTW3322A | DAL3390 | DAL3384 | | FTW5045 |
| FTW3357A | DAL3392A | DAL3386 | DAL3312 | |
| FTW3358A | DAL3394 | DAL3412A | DAL3314A | |
| FTW3365A | DAL3397A | DAL3414B | DAL3315K | |
| FTW3370A | DAL3425 | DAL3415A | DAL3316A | |
| FTW3371C | DAL3434E | DAL3418 | DAL3317 | |
| FTW3372 | DAL3438B | DAL3432 | DAL3324 | |
| FTW3375 | DAL3439B | DAL3433A | DAL3332A | |
| FTW3393B | DAL3440E | DAL3436 | DAL3333 | |
| FTW3429 | DAL3442E | DAL3472A | DAL3335A | |
| FTW3430A | DAL3448E | DAL3474 | DAL3336 | |
| FTW3435 | DAL3450EA | DALHYATTW | DAL3347B | |
| FTW5025 | DAL3451A | DALP0042 | DAL3361A | |
| FTW5027 | DAL5002 | DALP0128 | DAL3362 | |
| FTW5036 | DAL5003 | DALP0130D | DAL3367 | |
| FTW5038 | DAL5006A | DALP0253A | DAL3368 | |
| FTW5039A | DAL5040 | DALP0335 | DAL3373A | |
| FTW5046 | DAL5048 | DALP0604A | DAL3378 | |
| FTW5049A | DAL5053 | DALP0612 | DAL3379 | |
| FTW5050 | DAL5054A | DALP0621A | DAL3396 | |
| FTW5058 | DAL5058E | DALP0626 | DAL3398A | |
| FTWP0038A | DAL5083E | DALP0669K | DAL3399 | |
| FTWP0049A | DALP0101A | DALP0693 | DAL3400 | |
| FTWP0060 | DALP0123 | DALP0700 | DAL3408 | |
| FTWP0061A | DALP0132A | DALP0711A | DAL3411A | |
| FTWP0067A | DALP0581 | DALP0715C | DAL3413A | |
| FTWP0073A | DALP0585 | DALP0725A | DAL3420A | |
| FTWP0141A | DALP0587A | DALP0734B | DAL3428A | |
| FTWP0142 | DALP0595B | DALP0761 | DAL3431A | |
| | DALP0813A | DALP0805 | DAL3437 | |

*Fig. 10B*

ESTIMATION OF MOBILITY FOR NETWORK PLANNING BASED ON HIGHWAY MAPS AND TRAFFIC DATA

BACKGROUND OF THE INVENTION

1. Technical Field

The present invention relates generally to wireless digital communications systems and in particular to wireless digital communications systems employing code division multiple access or the like within a geographic region having empirically measurable traffic patterns. Still more particularly, the present invention relates to minimizing inter-switch handoff of expected service to mobile subscriber units within a code division multiple access wireless digital communications network.

2. Description of the Related Art

Digital telecommunications networks are increasingly based on code division multiple access (CDMA), a form of spread spectrum multiple access. Each signal within a CDMA system occupies all of the bandwidth all of the time. Separation of the signals depends on each being carried by an underlying waveform which is nearly orthogonal to all other signals. Digital codes are employed in CDMA to form the underlying quasi-orthogonal waveforms. Each user within a CDMA systems has a unique long period digital sequence called a pseudorandom sequence, which appears random to a casual observation of insufficient duration. This sequence is usually either (1) combined directly with the information stream to be sent, as in direct sequence transmission, or (2) used to select pre-planned spectrum channels among which the transmission is hopped, as in frequency hopping transmission.

CDMA provides a degree of protection against frequency-selective fading and reduces multipath interference. Signals which arrive late at the receiver do not match the portion of the code currently being utilized to decode the signal, and are thus rejected as interference. CDMA is also excellent in discriminating against noise. However, all signals within a given spectrum other than the signal of interest are treated as noise by a CDMA unit. Therefore, as more users attempt to communicate via a particular spectrum, performance for all users of that spectrum gradually degrades.

A cellular CDMA systems includes base transceiver stations (BTS's) or repeaters, referred to herein as cells, from which signals are routed into mobile switching centers (MSC), also called mobile telecommunications switching offices (MTSO) or electronic mobile exchanges (EMX) but referred to herein as simply switches. When a mobile unit moves across cell boundaries, an automatic handoff occurs. Depending on whether the two cells—current and destination—are routed to the same switch or to different switches, the type of handoff which occurs may be classified as intra-switch or inter-switch, respectively.

An intra-switch handoff is implemented as a soft handoff, in which a subscriber set near a cell boundary is served by two cells simultaneously. Concurrent service from both the old and new cells as the mobile subscriber crosses cell boundaries results in a smooth transition from cell to cell, with no noticeable change in voice quality. An inter-switch handoff, on the other hand, is implemented as a hard handoff, with the potential for a brief discontinuity of services from the two cells, where a first cell disconnects before the second cell, to which service has been handed off, completes a connection. This potential discontinuity results in a short disruption in the communication link, thereby causing a momentary degradation of the voice quality. Additionally, due to the large amount of information that needs to be transferred from one switch to another during a hard handoff, the inter-switch handoff consumes a larger amount of switch processor time than an intra-switch handoff. It is desirable, therefore, to minimize the number of inter-switch handoffs to the extent possible for typically mobile subscriber usage. The number of inter-switch handoffs may be controlled by the way cells are assigned to switches. However, cell usage by mobile subscribers and cell coverage depend in part on traffic patterns and the terrain within the cell, respectively.

Where the location and boundaries of each cell in a network and the number of switches in the network are known, it would be desirable to partition the cells among the switches in such a manner as to minimize the number of inter-switch handoffs. It would further be desirable to utilize available traffic and terrain data to partition cells in a given geographic area among the switches available to minimize the number of expected inter-switch handoffs. It would further be advantageous if the process developed could be applied to partitioning a new network based on geographical and traffic flow information, as well as to repartitioning existing networks based on operational mearurements.

SUMMARY OF THE INVENTION

It is therefore one object of the present invention to provide an improved wireless digital communications systems.

It is another object of the present invention to provide an improved wireless digital communications system employing code division multiple access or the like within a geographic region having empirically measurable traffic patterns.

It is yet another object of the present invention to minimize inter-switch handoff of expected service to mobile subscriber units within a code division multiple access wireless digital communications network.

The foregoing objects are achieved as is now described. The mobility of mobile subscribers within a wireless digital communications system is estimated based on highway maps and traffic data. Cells within the network are modelled as nodes connected by edges where neighboring cells are connected by roads. Each edge has two edge weight components representing traffic flow from one cell to the other and vice versa. The edge weight components are calculated from terrain factors based on the size or capacity of the roads connecting the two cells and the total traffic within the subject cell, which information may be obtained from commercial geographic databases and/or government agencies. The resulting edge weight represents an expected number of handoffs between the two cells. The problem of partitioning cells among available switches within the network is thus reduced to the purely mathematical problem of minimizing the total edge weights of edges intersected by the partition boundaries. Existing mathematical optimization techniques for optimizing node-edge systems may therefore be applied to reduce the total number of expected inter-switch handoffs as mobile subscribers pass from cell to cell within the network.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 8A–8B are the results of partitioning the cells of FIG. 7 among two switches in accordance with a preferred embodiment of the present invention;

FIGS. 9A–9B depict the results of partitioning the cells of FIG. 7 among three switches in accordance with a preferred embodiment of the present invention; and FIGS. 10A–10B are the results of partitioning the cells of FIG. 7 among four switches in accordance with a preferred embodiment of the present invention.

DETAILED DESCRIPTION

Figure 1:
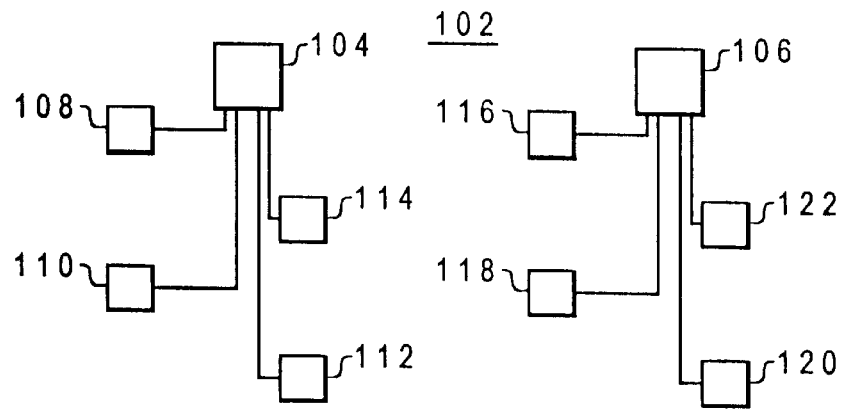
FIG. 1 depicts a block diagram of a portion of a digital communications network in which a preferred embodiment of the present invention may be implemented.

With reference now to the figures and in particular with reference to FIG. 1, a block diagram of a portion of a digital communications network in which a preferred embodiment of the present invention may be implemented is depicted. Network 102 includes a plurality of switches 104 and 106, such as the Nortel MTX switch available from Northern Telecom Limited. Connected to each switch 104 and 106 are sets of repeaters or base transceiver stations (BTS's) 108–114 and 116–122, respectively. Each BTS 108–122 defines a cell within the overall network. Although only four BTS's are depicted connected to each switch, those skilled in the art will recognize that many more BTS's may be routed to each switch within network 102.

Figure 2:
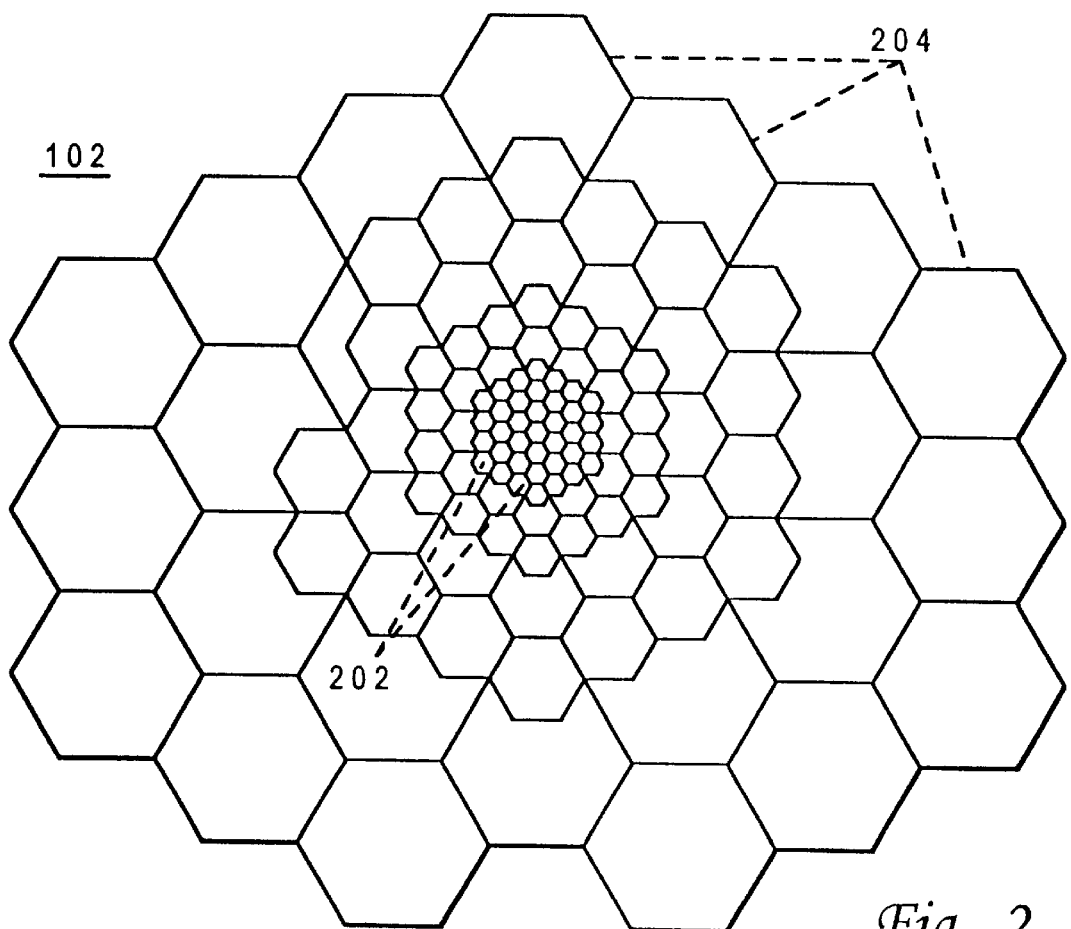
FIG. 2 is a diagram of a cell arrangement within a digital communications network in accordance with a preferred embodiment of the present invention.

Referring to FIG. 2, a diagram of a cell arrangement within a digital communications network in accordance with a preferred embodiment of the present invention is illustrated. Network 102 includes a plurality of cells, with cells 202 in urban areas smaller and denser than cells 204 in rural areas. The cell locations and boundaries are defined, as is the number of switches in network 102. However, cells are routed to specific switches within the network in such a manner as to minimize the number of expected inter-switch handoffs of mobile subscriber units passing between cells given the traffic flow and terrain within network 102.

Figure 3:
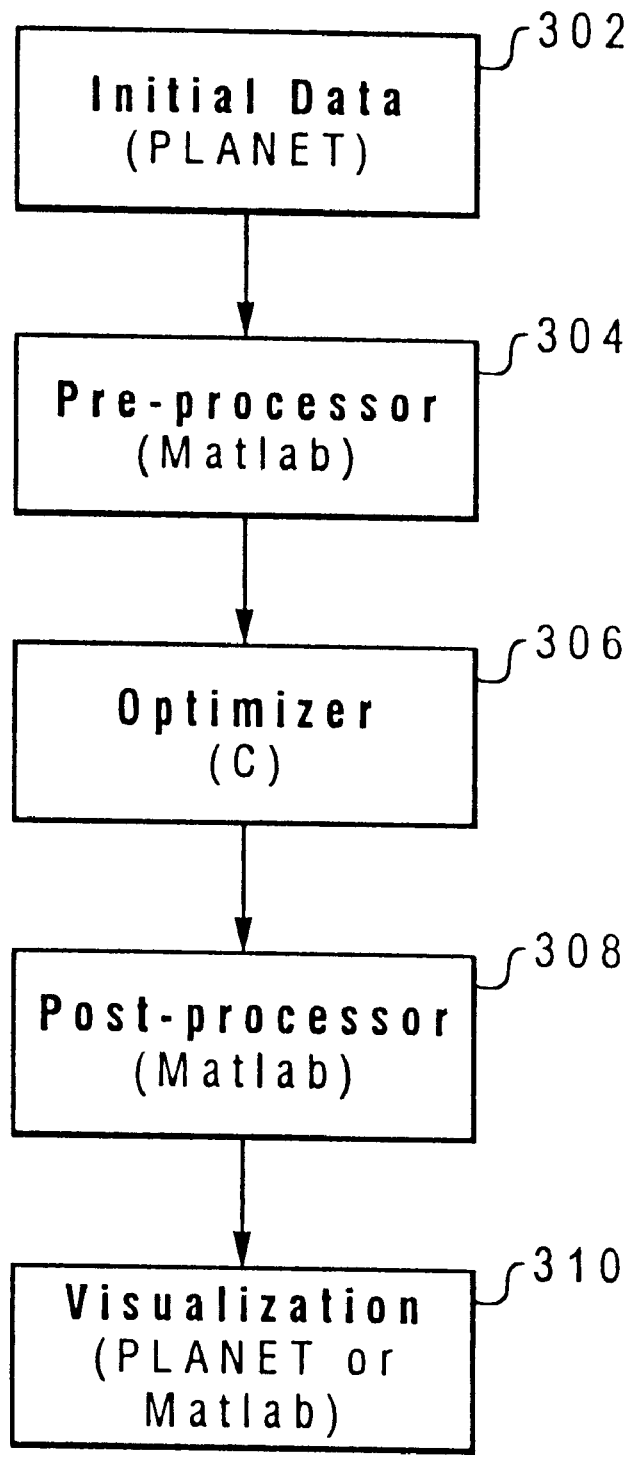
FIG. 3 depicts a block diagram of a data flow associated with optimizing the routing of cells to switches within a wireless digital communications network in accordance a preferred embodiment of the present invention.

With reference now to FIG. 3, a block diagram of a data flow associated with optimizing the routing of cells to switches within a wireless digital communications network in accordance a preferred embodiment of the present invention is depicted. Initial data is obtained through PLANET, as depicted in block 302. PLANET is a commercial radio frequency calculator software package. The initial data includes the location and boundaries of each cell. The initial data also includes the total traffic in each cell and the type of road that connects each pair of neighboring cells, which may be obtained from a geographical database, estimations, and/or marketing research.

The initial data is pre-processed as illustrated in block 304 using mathematical calculator software such as Matlab, a commercially available product. The pre-processing converts the initial data into a format recognized by the optimization routine. The formatted initial data is then passed to the optimization routine as depicted in block 306. The optimization routine, which in the exemplary embodiment is written in C, attempts to find the optimal partition of cells to the available switches. The output of the optimization routine is post-processed as illustrated in block 308 using Matlab to convert the output to a format recognized by the visualization software. The formatted output data may then be passed as depicted in block 310 to the visualization software, which may be either PLANET or MATLAB. The exemplary embodiment utilizes Matlab, which may be utilized to generate graphical representations of the output data such as those described below.

Figure 4:
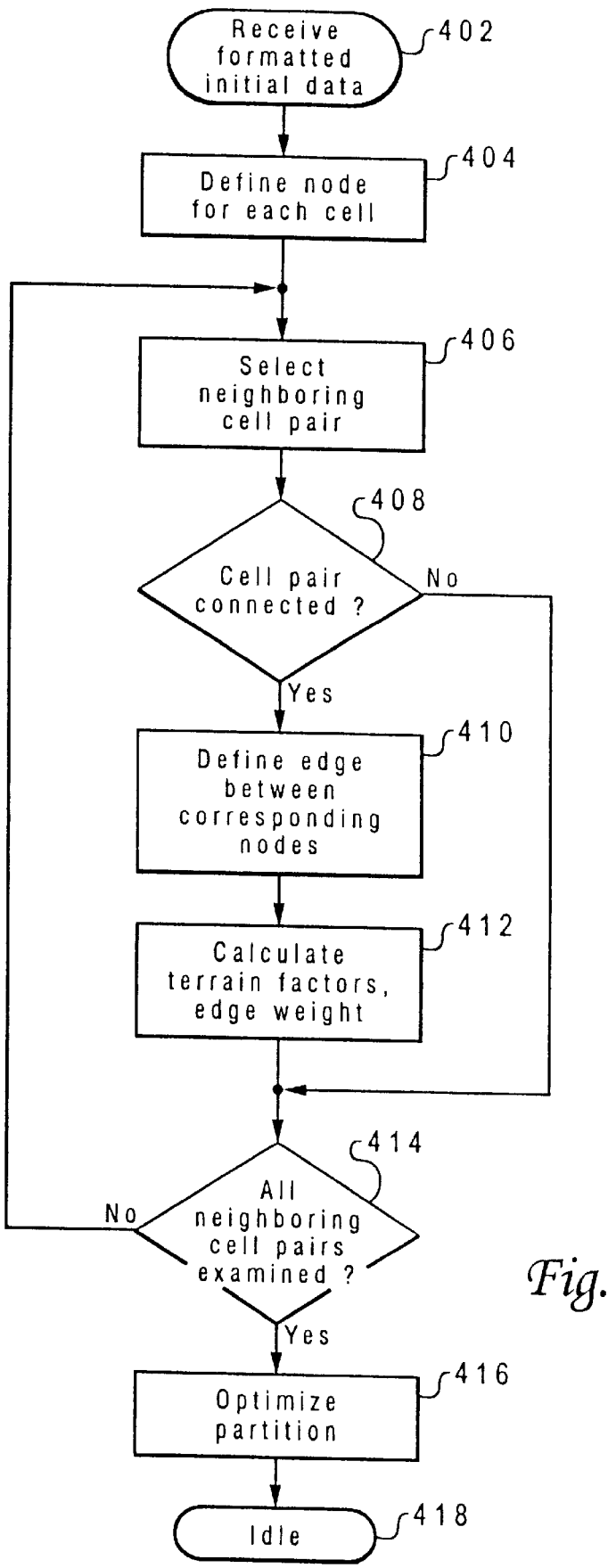
FIG. 4 is a high level flowchart for a process of partitioning cells among available switches in accordance with a preferred embodiment of the present invention.

Referring to FIG. 4, a high level flowchart for a process of partitioning cells among available switches in accordance with a preferred embodiment of the present invention is illustrated. The process begins at step 402, which illustrates receiving the formatted initial data required. This initial data includes the cell locations and boundaries, the total automobile traffic in each cell, and the type of roads which connects each pair of neighboring cells. The initial data may also include the automobile traffic from each cell to each neighboring cell and the automobile traffic from neighboring cells into each cell. The process then passes to step 404, which illustrates defining a node for each cell within the system for the purposes of modelling the system. Step 404 is the first step in modelling the system for optimizing partitioning of cells among available switches.

Figure 5A:
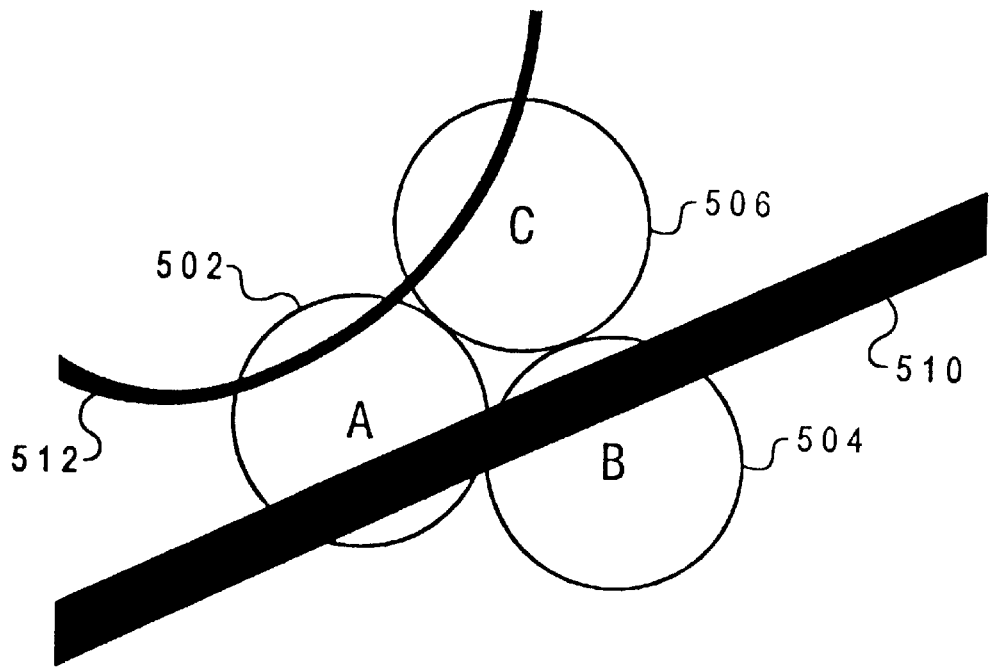
FIG. 5 depicts a diagram of the model employed in partitioning cells among available switches in accordance with a preferred embodiment of the present invention is depicted.
Figure 5B:
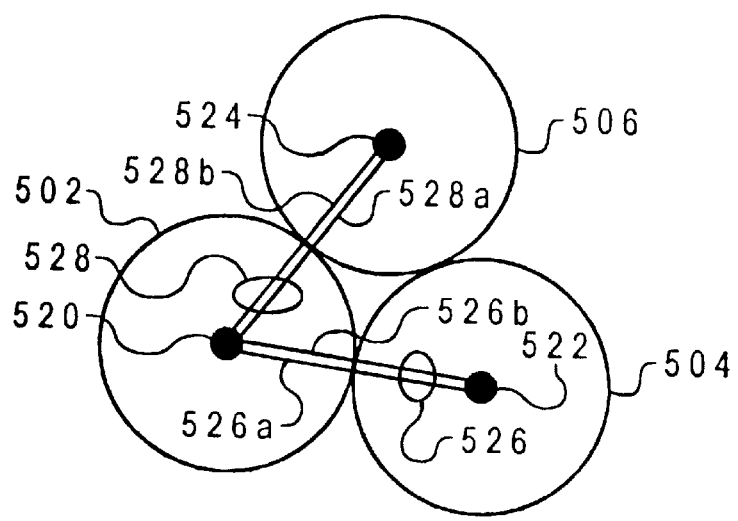

With reference now to FIGS. 5A and 5B, a diagram of the model employed in partitioning cells among available switches in accordance with a preferred embodiment of the present invention is depicted. In order to apply powerful existing numerical optimization methods to the problem of partitioning cells among available switches, an abstract model of a wireless digital communications network is constructed. The model employed according to the present invention is a graph consisting of nodes and edges. Each node represents a cell, such as cell A 502, cell B 504, or cell C 506 depicted in FIG. 5A. Each edge between two nodes represents the roads, such as roads 510 and 512 depicted in FIG. 5A, connecting the corresponding cells. Each edge has two associated edge weight components: one edge weight component representing traffic flow from a first cell into the second, and a second edge weight component representing traffic flow from the second cell into the first.

The arrangement depicted in FIG. 5A may be modelled as shown in FIG. 5B. Node 520 represents cell A, node 522 represents cell B, and node 524 represent cell C. Edge 526 connecting nodes 520 and 522 includes two associated weights: edge weight 526a representing traffic flow from cell A into cell B and edge weight 526b representing traffic flow from cell B into cell A. Similarly, edge 528 connecting nodes 520 and 524 includes associated edge weight 528a representing traffic flow from cell A into cell C and edge weight 528*b* representing traffic flow from cell C into cell A. Note that no edge connects nodes 522 and 524 because no roads connect cell B and cell C. Alternatively, the model may be viewed as including an edge between nodes 522 and 524, but with a total edge weight of zero.

Using the model described, minimization of the total number of expected inter-switch handoffs for a defined network reduces to partitioning the model graph into a given number of subgraphs, with the number of subgraphs corresponding to the number of available switches. The model graph is partitioned in such a way as to minimize the total sum of edge weights which are cut by the partition. Because the original problem is transformed under the model into a pure mathematical problem, existing software implementing a powerful algorithm with good theoretical properties may be employed to solve the problem.

Referring again to FIG. 4, the process continues from step 404 with the modelling of the system in accordance with the model described above. The process passes to step 406, which depicts selecting a neighboring pair of cells within the system. The process then passes to step 408, which illustrates a determination as to whether the cell pair selected is connected by at least one vehicular traffic path, such as a road, rail line, etc. If not, the process proceeds to step 414, which is described below. If at least one road or rail line connects the selected cell pair, however, the process proceeds to step 410, which depicts defining an edge between the nodes corresponding to each cell within the selected cell pair. The process then passes to step 412, which illustrates calculating terrain factors for the cells within the selected cell pair and an edge weight for the edge.

The calculation of edge weights (or estimation when actual data is not available) illustrated in step 412 is an important necessary step for partitioning the cells among available switches in accordance with the present invention. The edge weights are defined as functions of both the vehicular traffic (as opposed to call traffic) in the cells and the types of roads or rail lines connecting neighboring cells. The higher the total vehicular traffic within a cell, it may be inferred, the higher the vehicular traffic from that cell to a specific neighboring cell. Also, the larger the size of the roads which connected the cell to that specific neighboring cell, the higher the vehicular traffic going from the cell to that specific neighboring cell.

The validity of these inferences may be established from traffic flow data obtained from an appropriate government agency, and may be tested with reference to the arrangement depicted in FIG. 5A. Road 510 connecting cell A 502 to cell B 504 in the depicted example is a highway while road 512 connecting cell A 502 to cell C 506 is a small street. The larger street between cell A 502 and cell B 504 implies that more traffic will pass from cell A 502 into cell B 504 than from cell A 502 into cell C 506. Thus a terrain factor may be associated with each pair of neighboring cells, the terrain factor corresponding to the types of roads connecting the two cells and having a larger value when the connecting roads are larger. For the purposes of the model being utilized, terrain factor components of three values may be employed: a terrain factor component of 10 for each major highway connecting the two cells; a terrain factor component of 6 for medium sized roads; and a terrain factor component of 4 for small roads. The terrain factor for two cells will equal the sum of the terrain factor components for all roads connecting the two cells. It will be understood that any number of terrain factors may be utilized, and that any values may be utilized for the terrain factors. Where data regarding the actual average traffic per day on a given road or road segment is available, for example, these numbers may be used directly as terrain factors.

It may be reasoned, that the edge weight associated with traffic going from cell A into cell B is equal to the traffic volume in cell A times the terrain factor corresponding to cells A and B. Similarly, the edge weight associated with traffic going from cell B into cell A is equal to the traffic volume in cell B times the terrain factor corresponding to cells A and B. The validity of these relationships may be shown to hold using a more rigorous approach. The edge weight associated with handoffs from cell A to cell B ($E[HO_{A \to B}]$) may be expressed as:

$$E[HO_{A \to B}] = E[HO_A] \text{terrain} \frac{factor_{A,B}}{\sum_{X \in neighbors_A} \text{terrain } factor_{A,X}} \quad (1)$$

where $E[HO_A]$ is the edge weight associated with all handoffs from cell A to neighboring cells. The edge weight $E[HO_A]$ may itself be expressed as:

$$E[HO_A] = E[HO/call_A] \frac{Erlangs_A}{(average\ call\ duration)/3600} \quad (2)$$

where $E[HO/call_A]$ is an edge weight associated with the average number of handoffs per call within cell A and $Erlangs_A$ is the average traffic load (usage) of cell A in terms of the average number of users requesting service resulting in the probability that a new user will find all channels busy and hence be denied service in cell A. The edge weight associated with average number of handoffs per call within cell A may be further expressed as:

$$E[HO/call_A] \approx E[HO/call] \quad (3)$$

$$\sum_{X \in neighbors_A} \frac{terrain\ factor_{A,X}}{mean\left[\sum_{X \in neighbors_A} terrain\ factor_{A,X} \,\middle|\, A \in System\right]}$$

where $E[HO/call]$ is the edge weight associated with the average number of handoffs per call within the entire network or system. Combining equations (1), (2), and (3), the edge weight associated with handoffs from cell A to cell B may be compactly expressed as:

$$E[HO_{A \to B}] = K \cdot terrain\ factor_{A,B} \cdot Erlangs_A \quad (4)$$

where $$K = \frac{E[HO/call] \cdot 3600/(average\ call\ duration)}{mean\left[\sum_{X \in neighbors_A} terrain\ factor_{A,X} \,\middle|\, A \in System\right]} \quad (5)$$

is constant over all cells within the network or system. As described above, the edge weight associated with handoffs from cell A to cell B is equal to the total traffic in cell A times a terrain factor corresponding to cells A and B.

Referring again to FIG. 4, the process depicted proceeds from calculation of terrain factors and an edge weight in step 412 to step 414, which depicts a determination of whether all unique neighboring cell pairs within the system have been examined. If not, the process returns to step 406 for examination of another cell pair. If so, however, the modelling of the system is complete and the process proceeds to step 416, which illustrates optimizing the partition of cells between available switches based on the edge weights as described below with respect to FIG. 6. The process then passes to step 418, which illustrates the partitioning process becoming idle until again required.

Figure 6:
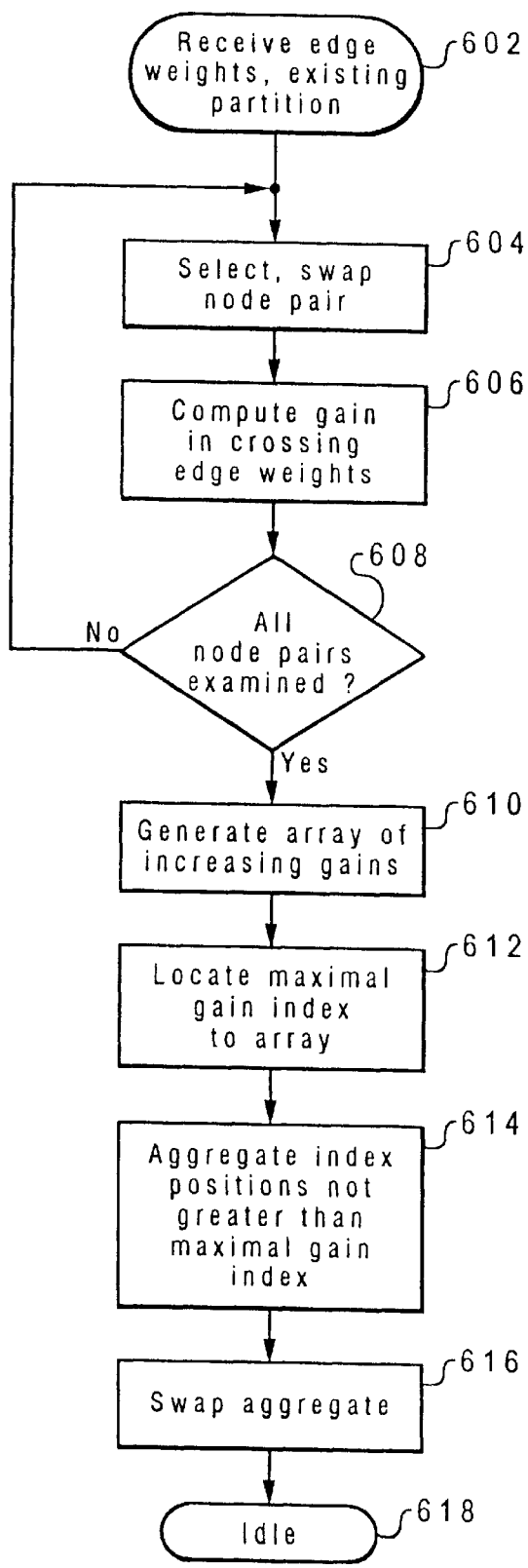
FIG. 6 is a high level flowchart for a process of optimizing the partitioning of cells among available switches in accordance with a preferred embodiment of the present invention.

Referring to FIG. 6, a high level flowchart for a process of optimizing the partitioning of cells among available switches in accordance with a preferred embodiment of the present invention is illustrated. The process depicted is described in B. W. Kernighan & S. Lin, "An Efficient Heuristic Procedure for Partitioning Graphs," *Bell Sys. Tech. J.*, pp. 291–307 (February 1970) and S. Subramanian & S. Madhavapeddy, "System Partitioning in a Cellular Network," *Proceedings VTC*, pp. 106–110 (April 1996). The process begins at step 602, which depicts receiving the edge weights associated with the model of the system being partitioned, together with an existing ad hoc partition of cells among the available switches. The process then passes to step 604, which illustrates selecting a pair of nodes within the system, the node pair including a node in each partition, and swapping the nodes between the partitions. The process next passes to step 606, which depicts calculating a gain (decrease) in the partition crossing edge weights—that is, edge weights which the partition crosses—resulting from the swap. The process then passes to step 608, which illustrates a determination of whether all node pairs have been examined. If not, the process returns to step 604 for selection of a new node pair and repetition of step 606. In this manner, the process generates gain for each node pair within the system.

Once the gain for each prospective node pair is calculated, the process proceeds to step 610, which depicts ordering the node pairs in an indexed array of descending order of the computed gains. Once the array has been generated, the process proceeds to step 612, which illustrates locating the maximal gain index to the array. The maximal gain index identifies the point within the array where the summation of gains up to and including the selected index position is maximized. The process then passes to step 614, which depicts aggregating all node pairs having an index which is not larger than the maximal gain index into a single pair of nodes. The process next passes to step 616, which illustrates swapping the aggregate node pair, and then to step 618, which depicts the process becoming idle until again required.

When there are more than two switches in a system to be partitioned, the process described may be extended by working with two switches at a time and applying process described above for partitioning a two-switch system. By sequentially working through all possible pairs of two switches for the system, the two-switch process is effectively generalized for optimizing partitioning of an n-switch system.

The process described above assumes that the partition is balanced, i.e., that the number of cells routed to each switch is equal. Where there is no strict requirement that the same number of cells be routed to each switch, or at most the partitioning problem is only bounded by ranges of cell numbers which may be routed to each switch, dummy nodes may be added to the model. Dummy nodes represent fictitious cells and have no edges to any other nodes. Dummy nodes are assigned a unit node weight, effectively transforming the model back into a balanced partition. Once the final partition is found, the dummy nodes are discarded to yield a solution which contains only real cells and is weight-minimized. The number of dummy nodes added to a model may be selected according to the requirements on the range of the cell numbers which may be routed to each switch. A software implementation of this process is commercially available.

The process described above may be applied to both partitioning new networks and repartitioning existing networks. When applied to partitioning a new network, the model is constructed with terrain factors and edge weights derived from road data, available from any commercial geographical database, and traffic flow data, which is typically available from one or more government agencies (such as a state Department of Transportation). When applied to repartitioning or optimizing existing networks, however, operational measurements may be utilized. Typically switches are equipped with a plurality of counter for tracking handoffs from each cell to each other cell neighboring the first cell. These measurements may be utilized—alone or in conjunction with road data and traffic flow information—to defined terrain factors and edge weights in modelling the existing network.

Figure 7:
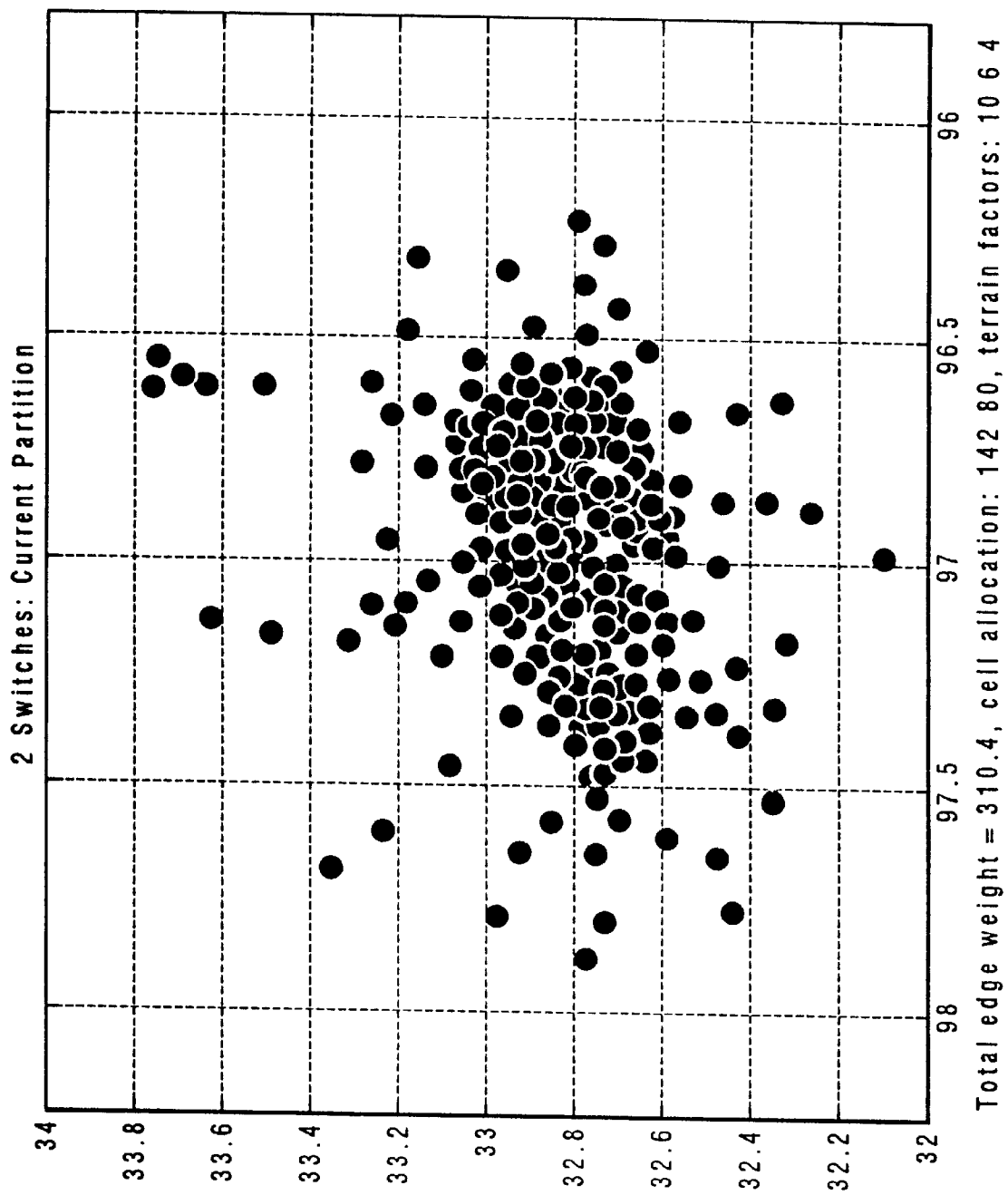
FIG. 7 depicts an ad hoc partition of cells having defined locations and boundaries among two switches within a wireless digital communications system.
Figure 8A:
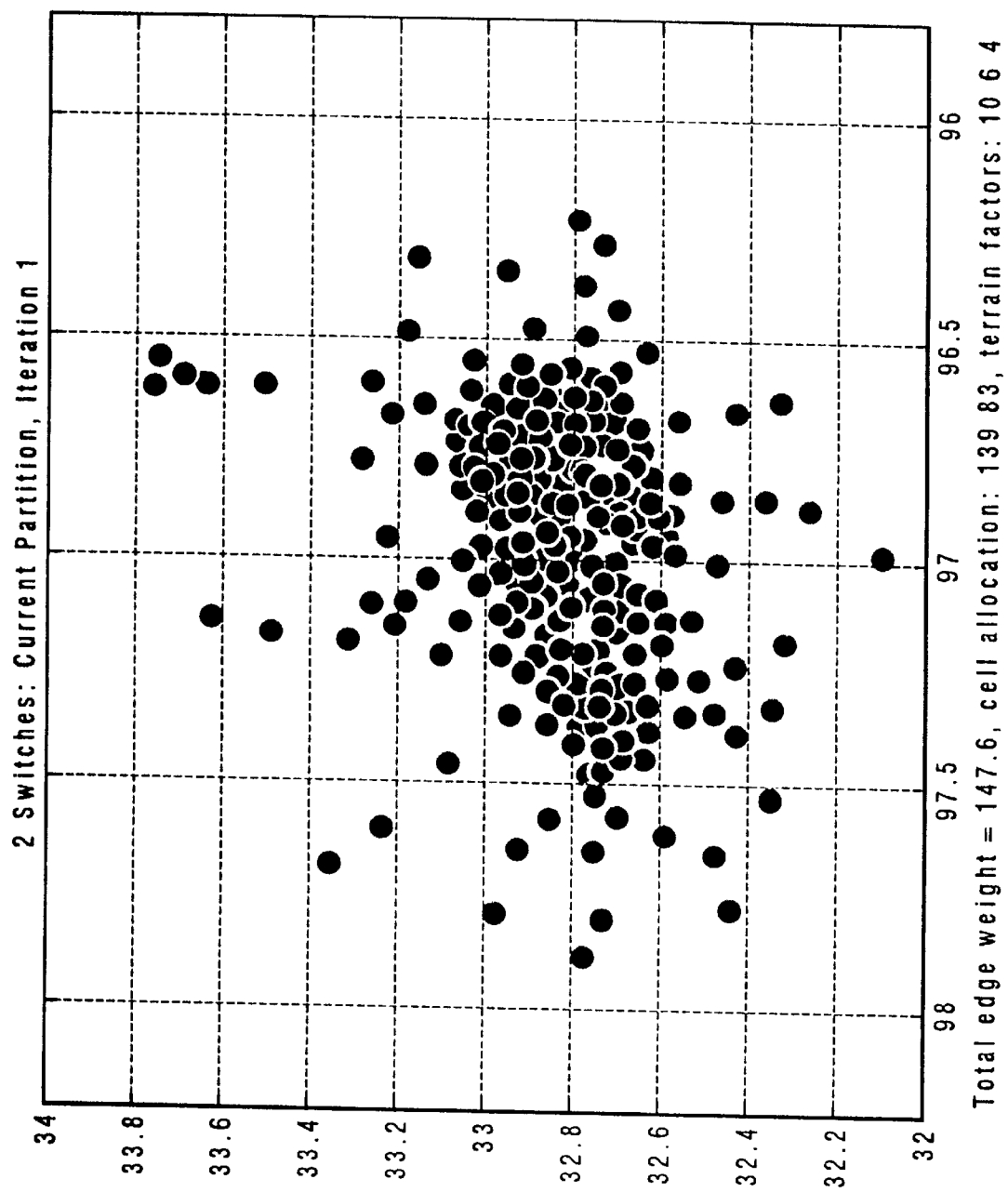

With reference now to FIGS. 7, 8A, and 8B, comparative results of partitioning cells having defined locations and boundaries among two switches within a wireless digital communications system in accordance with a preferred embodiment of the present invention are depicted. FIG. 7 depicts cell locations for a wireless digital communications network for a typical metropolitan trading area (MTA), demonstrating that the present invention may be applied to new or existing networks at any geographic location. The network is modelled as nodes and edges in accordance with a preferred embodiment of the present invention. The x- and y-axis of the plot depicted defines the grid location of a base transceiver station for a cell. An ad hoc partition of the cells among two switches results in 142 cells being allocated to a first switch and 80 switches allocated to a second switch. Utilizing terrain factors of 10, 6 and 4 as described earlier in conjunction with available traffic data, edge weights are calculated. The ad hoc partition results in edges with a total weight of 310.4 being cut, representative of the number of inter-switch handoffs which may be expected to occur within the network from which the results are drawn.

Referring to FIG. 8A, the same network as that depicted in FIG. 7 is illustrated with the partition of cells among the two switches optimized in accordance with the present invention. The same terrain factors and traffic data are utilized, together with dummy nodes to emulate a balanced partition. The optimization results in 139 cells being allocated to the first switch and 83 being allocated to the second switch, a change of three cells from the ad hoc partition. From the same edge weights between nodes employed for the partition characterized in FIG. 7, the new partition results in edges with a total weight of only 147.6 being cut. Thus, for the optimized partition there is a decrease of approximately 50% in the number of expected inter-switch handoffs over the ad hoc partition. FIG. 8B is a table listing cell names according to the switch to which the cells are allocated under the optimized partition.

Figure 9A:
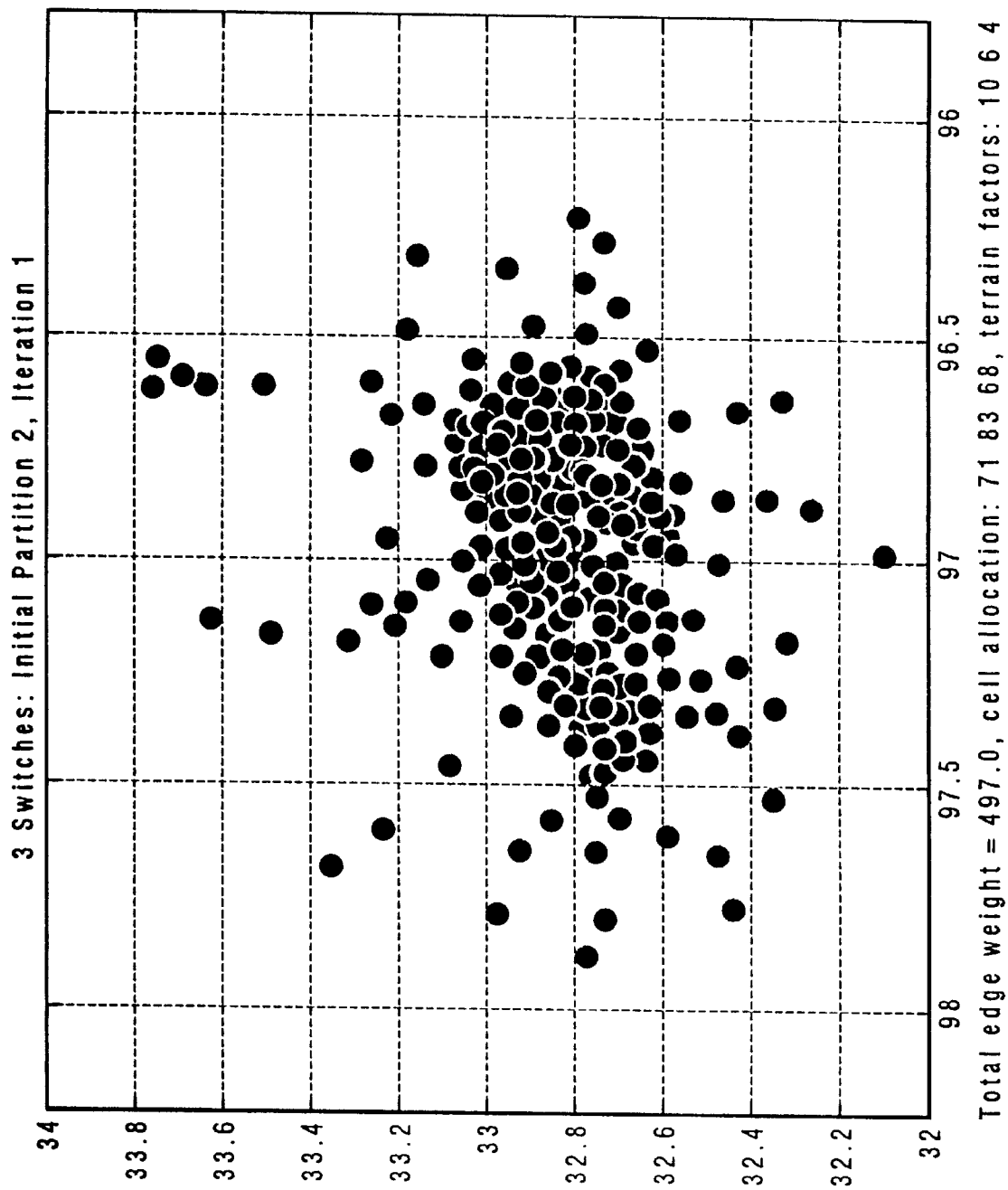

With reference to FIGS. 9A and 9B, the results of partitioning the cells of FIG. 7 among three switches in accordance with a preferred embodiment of the present invention are depicted. In some cases additional switches may be required for the future, due to an increase in the number of subscribers and a corresponding increase in the number of cells. FIG. 9A illustrates the results of optimizing the partitioning of the existing cells depicted in FIG. 7 among three switches as described above. The same terrain factors and traffic data are again employed, resulting in allocation of 71 cells to a first switch, 83 cells to a second switch, and 68 cells to a third switch within the network. The two partitions combined cut edges having a total weight of 497.0, representing an expected number of inter-switch handoffs for the three switch system. FIG. 9B lists the cell names according to the switches to which they were allocated.

Figure 10A:
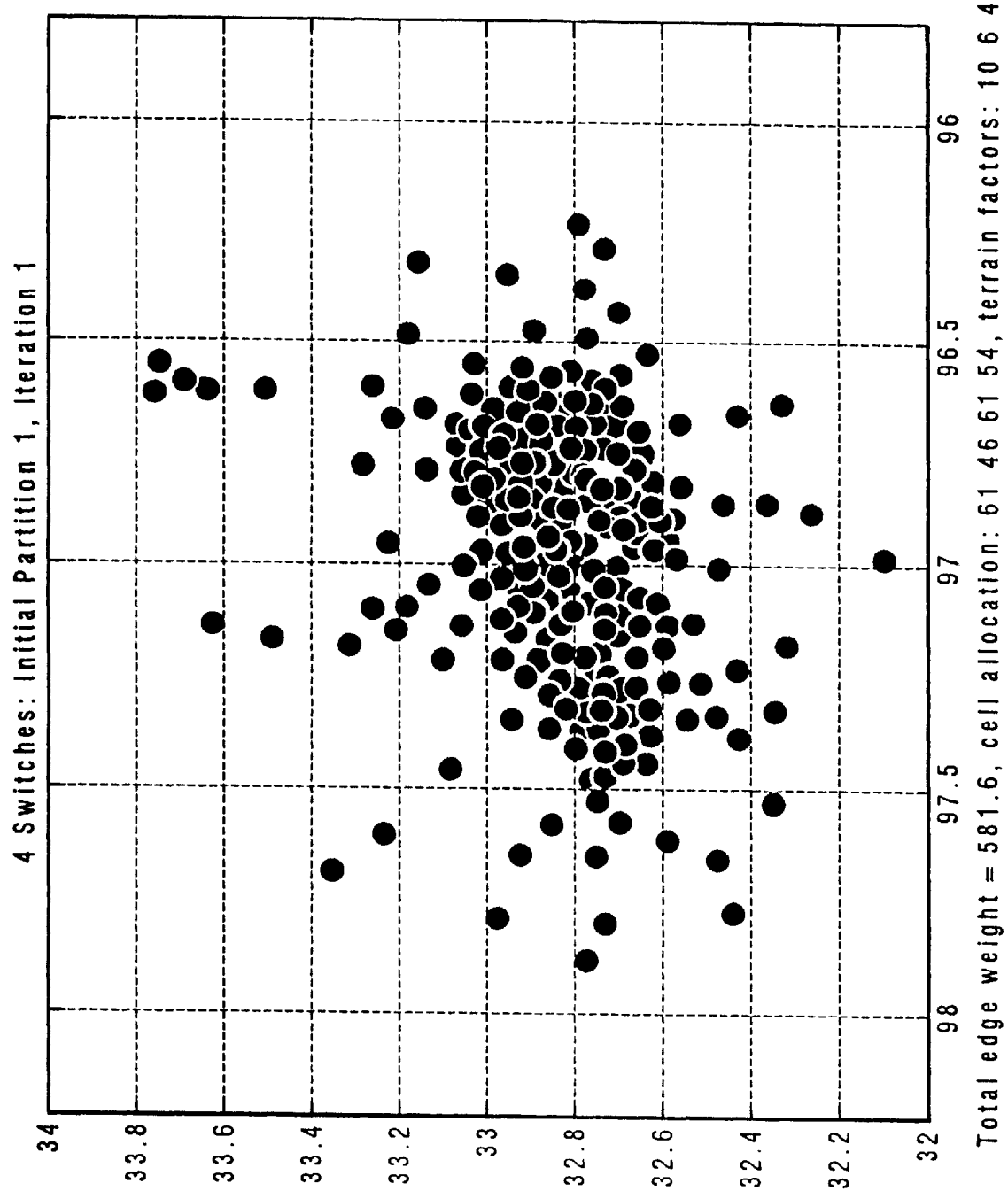

FIGS. 10A–10B are the results of partitioning the cells of FIG. 7 among four switches in accordance with a preferred embodiment of the present invention. Again, the same terrain factors and traffic data are employed to optimize the partitioning of the existing cells depicted in FIG. 7 among four switches using the process described earlier. FIG. 10A depicts the resulting allocation of cells: 61 to a first switch, 46 to a second switch, 61 to a third switch, and 54 to a fourth switch. The three partitions together cut edges having a total weight of 581.6, representing an expected number of inter-switch handoffs for the four switch system. FIG. 10B lists the cell names according to the switches to which they were allocated.

In both the three switch and four switch cases demonstrated, the process of the present invention for optimizing the partitioning of cells among the available switches will almost always find a solution with significantly reduced total edge weights cut by the partitions in comparison to ad hoc or rule-of-thumb methods.

Although described in the context of cells, the present invention may also be employed in the context of cell sectors. In a typical wireless communications network, each cell is usually divided into a number of sectors, generally either three (120° sectors) or six (60° sectors), with multiple base transceiver stations having directional antennas employed to service each sector. While sectors for the same cell are normally routed to the same switch, there are no technical limitations requiring adherence to this convention. Each sector may be individually routed, improving the granularity of the partitions and potentially achieving even further reductions in inter-switch handoffs. In such a circumstance, each sector would be modeled as a node and each edge weights defined for traffic into and out of adjoining sectors, regardless of whether the sectors may be found in the same cell.

The present invention provides a method of estimating mobility based on road maps and traffic data for planning a wireless digital communications network. Cells are modelled as nodes connected by edges where the cells are connected by roads. Each edge includes two edge weight comparisons representing the traffic flow from one cell to the other and vice versa. Partitioning the cells among available switches is thus reduced to a purely mathematical problem of minimizing the total weights of edges cut by the partition boundaries. Therefore, powerful existing algorithms may be applied to the problem of optimizing the partitions. Using the optimization of the present invention, it is possible to drastically reduce the number of expected inter-switch handoffs. This will improve overall voice quality of the services provided and save processor time within the switches of the system. It should be noted that the methodology applied to optimizing partitioning of cells among available switches may be applied to other problems in configuring wireless digital communications networks, such as location area optimization and base station controller partitioning.

It is important to note that while the present invention has been described in the context of a fully functional communications system, those skilled in the art will appreciate that the mechanism of the processes of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

The description of the preferred embodiment of the present invention has been presented for purposes of illustration and description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method of estimating mobility within a wireless communications system, comprising:

defining a plurality of nodes, each node within the plurality of nodes representing a cell within the system;

determining whether a pair of neighboring cells within the system are connected by at least one road; and responsive to determining that the pair of cells within the system are connected by at least one road, defining an edge between a pair of nodes within the plurality of nodes corresponding to the pair of cells, wherein the edge has a first associated edge weight representing traffic flow from a first cell within the pair of cells into a second cell within the pair of cells and a second associated edge weight representing traffic flow from the second cell into the first cell, wherein traffic mobility within the system may be estimated.

2. The method of claim 1, wherein the step of defining an edge between a pair of nodes further comprises:

defining the edge with the first associated edge weight equal to a product of a constant, a terrain factor associated with traffic flow from the first cell to the second cell, and an average usage of the first cell, and with the second associated edge weight equal to a product of the constant, a terrain factor associated with traffic flow from the second cell to the first cell, and an average usage of the second cell.

3. The method of claim 2, wherein the constant is proportional to an average number of handoffs per call within the system.

4. The method of claim 2, wherein the first and second edge wieghts are calculated from K·terrain factor$_{A,B}$·Erlangs$_A$.

5. The method of claim 1, further comprising:

defining edge weights for each unique pair of nodes representing neighboring cells within the system; and partitioning cells within the system among available switches in a manner minimizing a total of edge weights for edges between node pairs corresponding to neighboring cells routed to different switches among the available switches.

6. The method of claim 5, wherein the step of partitioning cells further comprises:

defining ad hoc partitions containing nodes corresponding to cells routed to the same switch among the available switches;

selecting a node pair including a first node from a first partition and a second node from a second partition adjoining the first partition;

swapping the node pair so that the first partition contains the second node and the second partition contains the first node; and determining a change resulting from swapping the node pair in the total of edge weights for edges between node pairs including nodes in different partitions.

7. The method of claim 6, further comprising:

determining a change in the total of edge weights for edges between node pairs including nodes in different partitions resulting from swapping each unique node pair including nodes in different partitions and corresponding to neighboring cells;

ordering an indexed array of changes resulting from swapping node pairs; and identifying an array element within the indexed array where a sum of changes up to and including the array element is maximized.

8. A wireless communications system, comprising:

a plurality of base transceiver stations, each base transceiver station within the plurality of base transceiver stations defining a cell within the wireless communications system, providing communications to mobile units within the cell, and handing off responsibility for providing communications to a neighboring cell as the mobile units moves from the cell to the neighboring cell; and a plurality of switches, wherein the plurality of base transceiver stations are routed to switches within the plurality of switches in a manner minimizing inter-switch handoffs for mobile units moving from a cell to a neighboring cell, wherein the plurality of base transceiver stations are partitioned, each partition containing base transceiver stations routed to the same switch within the plurality of switches, wherein the plurality of base transceiver stations are partitioned by defining a plurality of nodes, wherein each node represents a cell within the system, defining an edge between each pair of adjacent nodes within the plurality of nodes representing neighboring cells connected by at least one road, wherein the edge has an associated edge weight, and assigning nodes to partitions such that a total of edge weights between node pairs containing nodes within different partitions is minimized.

9. The wireless communications system of claim 8, wherein the step of defining an edge between each pair of adjacent nodes further comprises:

defining a first component of the edge weight for traffic flow from a first cell represented by a first node within the node pair into a second cell represented by a second node within the node pair; and defining a second component of the edge weight for traffic flow from the second cell into the first cell.

10. The wireless communications system of claim 8, wherein the step of defining an edge between each pair of adjacent nodes further comprises:

setting the edge weight proportional to a size of roads connecting the neighboring cells.

11. The wireless communications system of claim 8, wherein the step of defining an edge between each pair of adjacent nodes further comprises:

setting the edge weight proportional to an amount of traffic flow between the neighboring cells.

12. A computer program product for use with a data processing system, comprising:

a computer usable medium;

first instructions on said computer usable medium for defining a plurality of nodes, wherein each node represents a cell within a wireless communications system;

second instructions on said computer usable medium for defining an edge between each pair of adjacent nodes within the plurality of nodes representing neighboring cells connected by at least one road, wherein the edge has an associated edge weight; and third instructions on said computer usable medium for defining a plurality of partitions, each partitions within the plurality of partitions representing a switch within the wireless communications system; and fourth instructions on said computer usable medium for assigning each node with the plurality of nodes to a partition such that a total of edge weights between node pairs containing nodes within different partitions is minimized.

13. The computer program product of claim 12, further comprising:

fifth instructions on said computer usable medium for determining a total of edge weights between node pairs including nodes within different partitions.

14. The computer program product of claim 12, wherein the fourth instructions further comprise:

instructions on said computer usable medium for assigning nodes to partitions on an ad hoc basis;

instructions on said computer usable medium for selecting a node pair including a first node from a first partition and a second node from a second partition adjoining the first partition;

instructions on said computer usable medium for swapping the node pair between partitions so that the first partition contains the second node and the second partition contains the first node; and instructions on said computer usable medium for determining a change in a total of edge weights between node pairs including nodes within different partitions resulting from swapping the node pair.

15. The computer program product of claim 14, wherein the fourth instructions further comprise:

instructions on said computer usable medium for determining a change in the total of edge weights between node pairs including nodes within different partitions resulting from swapping each unique node pair including nodes within different partitions;

instructions on said computer usable medium for ordering an indexed array of changes resulting from swapping node pairs in descending order; and instructions on said computer usable medium for identifying an array element within the indexed array wherein a sum of changes up to and including the array element is maximized.

16. A data processing system for partitioning cells within a wireless communications network, comprising:

a processor means, the processor means:

defining a plurality of nodes, each node within the plurality of nodes representing the cell within a wireless communications network;

defining an edge between each pair of adjacent nodes within the plurality of nodes representing neighboring cells connected by at least one vehicular traffic path, wherein the edge has an associated edge weight including a first component proportional to vehicular traffic flow from a first cell to a second cell and a second component proportion to vehicular traffic flow from the second cell to the first cell; and defining a plurality of partitions, each partition within the plurality of partitions representing a switch within the wireless communications system to which a base transceiver station for a cell may be routed; and assigning each node with the plurality of nodes to a partition such that a total of edge weights between node pairs containing nodes within different partitions is minimized.

17. The data processing system of claim 16, wherein the processor means assigns each node within the plurality of nodes to a partition by:

assigning nodes to partitions on an ad hoc basis;

selecting a node pair including a first node from a first partition and a second node from a second partition adjoining the first partition;

swapping the node pair between partitions so that the first partition contains the second node and the second partition contains the first node;

determining a change in a total of edge weights between node pairs including nodes within different partitions resulting from swapping the node pair; and performing the steps of selecting a node pair, swapping the node pair, and determining a change in a total of edge weights for each node pair within the plurality of nodes including a node within different, adjoining partitions.

18. The data processing system of claim 17, wherein the processor means assigns each node within the plurality of nodes to a partition by:

creating dummy nodes within a partition after assigning nodes to partitions on an ad hoc basis.

\* \* \* \* \*